(12) United States Patent
Park et al.

(10) Patent No.: US 8,691,457 B2
(45) Date of Patent: Apr. 8, 2014

(54) FUEL CELL SYSTEM AND DRIVING METHOD THEREOF

(75) Inventors: Jun-Young Park, Suwon-si (KR); Jun-Won Suh, Suwon-si (KR); Chi-Seung Lee, Suwon-si (KR); Seong-Jin An, Suwon-si (KR); Jin-Hwa Lee, Suwon-si (KR); Hyun Kim, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1055 days.

(21) Appl. No.: 12/654,450

(22) Filed: Dec. 18, 2009

(65) Prior Publication Data
US 2010/0159296 A1 Jun. 24, 2010

(30) Foreign Application Priority Data
Dec. 19, 2008 (KR) ........................ 10-2008-0130521

(51) Int. Cl.
*H01M 8/04* (2006.01)

(52) U.S. Cl.
USPC ........................................................ 429/429

(58) Field of Classification Search
USPC ................................................ 429/429–432
See application file for complete search history.

(56) References Cited

U.S. PATENT DOCUMENTS

| 2004/0101724 | A1* | 5/2004 | Imamura et al. | 429/22 |
| 2006/0188765 | A1* | 8/2006 | Matsuzaki et al. | 429/23 |
| 2007/0224482 | A1 | 9/2007 | Shimoi et al. | |

FOREIGN PATENT DOCUMENTS

| JP | 01-298649 B2 | 11/1995 |
| JP | 2005322570 A | 11/2005 |
| JP | 2006-185904 | 7/2006 |
| JP | 2006-236739 | 9/2006 |
| JP | 2007-214072 | 8/2007 |
| JP | 2007-323954 | 12/2007 |
| JP | 2007323959 A | 12/2007 |
| KR | 10-2006-0096115 | 9/2006 |
| KR | 10-2007-0085778 | 8/2007 |

OTHER PUBLICATIONS

Korean Office action issued by Korean Patent Office on Jun. 28, 2011, corresponding to Korean Patent Application No. 10-2008-0130521 and Request for Entry of Accompanying Office Action attached herewith.
Korean Office Action issued on Sep. 27, 2010 in the corresponding Korean Patent Application No. 2008-0130521 and Request for Entry of the Accompanying Office Action herewith.

* cited by examiner

*Primary Examiner* — Jonathan G Leong
(74) *Attorney, Agent, or Firm* — Robert E. Bushnell, Esq.

(57) ABSTRACT

Disclosed are a fuel cell system, and a method of driving the system. The fuel cell system includes a fuel cell stack having a plurality of unit cells producing electricity, a switching unit connecting the plurality of unit cells to a discharge resistor, a switching controller synchronously operated when the voltage of the fuel cell stack reaches an open circuit voltage after power generation of the fuel cell stack is stopped. The switching controller generates select control signals to control the switching unit. The fuel cell system further includes a sensing unit measuring respective cell voltages of the plurality of unit cells and generating cell voltage sensing signals to control activation periods of the select control signals.

10 Claims, 2 Drawing Sheets

FUEL CELL SYSTEM AND DRIVING METHOD THEREOF

CLAIM OF PRIORITY

This application makes reference to, incorporates the same herein, and claims all benefits accruing under 35 U.S.C. §119 from an application earlier filed in the Korean Intellectual Property Office on 19 Dec. 2008 and there duly assigned Serial No. 10-2008-0130521.

BACKGROUND OF THE INVENTION

1. Field of the Invention

The present invention relates to a fuel cell system and a method of driving the same, and more particularly, to a polymer electrolyte fuel cell system and a driving method thereof.

2. Description of the Related Art

A fuel cell system is a power system that directly converts the energy of a chemical reaction of hydrogen in a hydrocarbon-based material such as methanol, ethanol, and natural gas with oxygen into electrical energy.

The fuel cells are, depending upon the kinds of electrolytes to be used, classified into phosphoric acid fuel cells, molten carbonate fuel cells, solid oxide fuel cells, polymer electrolyte fuel cells, or alkaline fuel cells. The respective fuel cells are operated based on fundamentally the same principle, but are differentiated in the kind of fuels to be used, the operation temperature, the catalyst, and the electrolyte.

Among the fuel cells, a polymer electrolyte membrane fuel cell (PEMFC) has been recently developed with excellent power generation capacity, lower operation temperature, and rapid starting and short response time characteristics, compared with other fuel cells. The PEMFC may be widely used for mobile power for cars, distributed power for household and public buildings, and as a small power supply for electronic appliances.

The PEMFC has a basic system structure with a stack, a reformer, a fuel tank, and a fuel pump. The stack forms a main body of the fuel cell system, and the fuel pump supplies a fuel from the fuel tank to the reformer. The reformer reforms the fuel to generate hydrogen gas, and supplies the generated hydrogen gas to the stack. With the above-structured PEMFC, the fuel stored in the fuel tank is supplied to the reformer by way of the pumping pressure of the fuel pump, and the reformer reforms the fuel to generate hydrogen gas. The stack makes the hydrogen gas electrochemically react with oxygen, thereby producing electrical energy.

With the fuel cell system, the stack substantially generates electricity, and has a laminated structure with several to several tens of unit cells based on a membrane electrode assembly (MEA) and a separator (also called a bipolar plate). The membrane electrode assembly has a structure where an anode (also called "fuel electrode" or "oxidation electrode") and a cathode (also called "air electrode" or "reduction electrode") are sandwiched by interposing a polymer electrolyte film containing hydrogen ion conductive polymers therebetween. The bipolar plate simultaneously conducts the roles of dividing the membrane/electrode structure and supplying hydrogen and oxygen required for the fuel cell reaction to the anode and the cathode thereof, and as a conductor for connecting the anode and the cathode of the respective membrane/electrode structures in series. The fuel containing hydrogen such as an aqueous methanol solution or reforming gas is supplied to the anode through the bipolar plate, while the oxidant containing oxygen such as air is supplied to the cathode. In this process, the oxidation reaction of hydrogen gas occurs in the anode while the reduction reaction of oxygen occurs in the cathode, thereby producing electrons for electricity, and incidental heat and moisture.

The anode and the cathode of the fuel cell contain catalysts for facilitating the oxidation of the fuel and the reduction of oxygen. With the PEMFC, the catalysts for the cathode and the anode are made by diffusing platinum particles into a carrier of amorphous carbon.

Meanwhile, when the power generation of the fuel cell system is stopped, switching valves on the anode and cathode sides are closed to thereby stop the supply of hydrogen and oxygen. However, during the process of closing the switching valves, the hydrogen gas and the oxygen gas are partially injected into the regions of the anode and the cathode located close to the switching valves. The injected hydrogen gas flows to the cathode through the electrolyte film, and reacts with oxygen in the cathode. Consequently, energy level of the cathode is increased. When the energy level of the cathode is increased, platinum is oxidized so that it deteriorates in terms of catalyst activity, and is dissolved so that the catalyst area is reduced. Particularly when the heightened cathode level is maintained for a long period of time, such problems become serious, and the life span of the fuel cell stack shortens. In order to solve this problem, a technique for removing remnants of hydrogen and oxygen by using a nitrogen-based purge unit has been developed to lower the heightened cathode level. However, the usage of such a purge unit is limited to the inside of a laboratory, and requires a long period of time, up to one or more hours, to remove the remnant gas, and a large volume. Furthermore, the nitrogen-based purge unit requires an additional cost for the nitrogen usage, and hence it is practically difficult to use such a unit in a fuel cell system.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a fuel cell system and a driving method thereof having advantages of lowering the cathode level of a fuel cell stack within a short period of time after the operation of the fuel cell system is stopped.

An exemplary embodiment of the present invention provides a fuel cell system including a fuel cell stack having a plurality of unit cells producing electricity, a switching unit connecting the plurality of unit cells to a discharge resistor, a switching controller synchronously operated when the voltage of the fuel cell stack reaches an open circuit voltage after power generation of the fuel cell stack is stopped where and the switching controller generates select control signals to control the switching unit, and a sensing unit sensing respective cell voltages of the plurality of unit cells, and generates cell voltage sensing signals to control the activation periods of the select control signals.

The switching unit may include a plurality of first discharge switches and a plurality of second discharge switches. Each of the first discharge switches connects a first terminal of one of the unit cells to a first end of the discharge resistor, and each of the second discharge switches connects a second terminal of the one of the unit cells to a second end of the discharge resistor.

One of unit cells may be connected to the discharge resistor whenever the select control signals are activated. Rest of the unit cells except the one of unit cells may not be connected to the discharge resistor.

The sensing unit may generate the cell voltage sensing signals when the measured respective cell voltages of the plurality of unit cells reach a predetermined voltage.

The sensing unit may be connected to one end of the discharge resistor.

Another exemplary embodiment of the present invention provides a method of operating a fuel cell system including a fuel cell stack with a plurality of unit cells, a switching unit for connecting the plurality of unit cells to a discharge resistor, and a switching controller for generating select control signals to control the switching unit. The method includes steps of activating the select control signals when the voltage of the fuel cell stack reaches an open circuit voltage after the power generation of the fuel cell stack is stopped, and connecting the unit cells to the discharge resistor whenever the select control signals are activated.

The method may further include a step of deactivating the select control signals when the voltage of the selected unit cell reaches a predetermined voltage.

The step of the connecting the unit cells to the discharge resistor may includes a step of sequentially connecting the unit cells to the discharge resistor.

As described above, with an exemplary embodiment of the present invention, the cathode level of the fuel cell stack can be lowered within a short period of time after the system operation is stopped.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Figure 1:
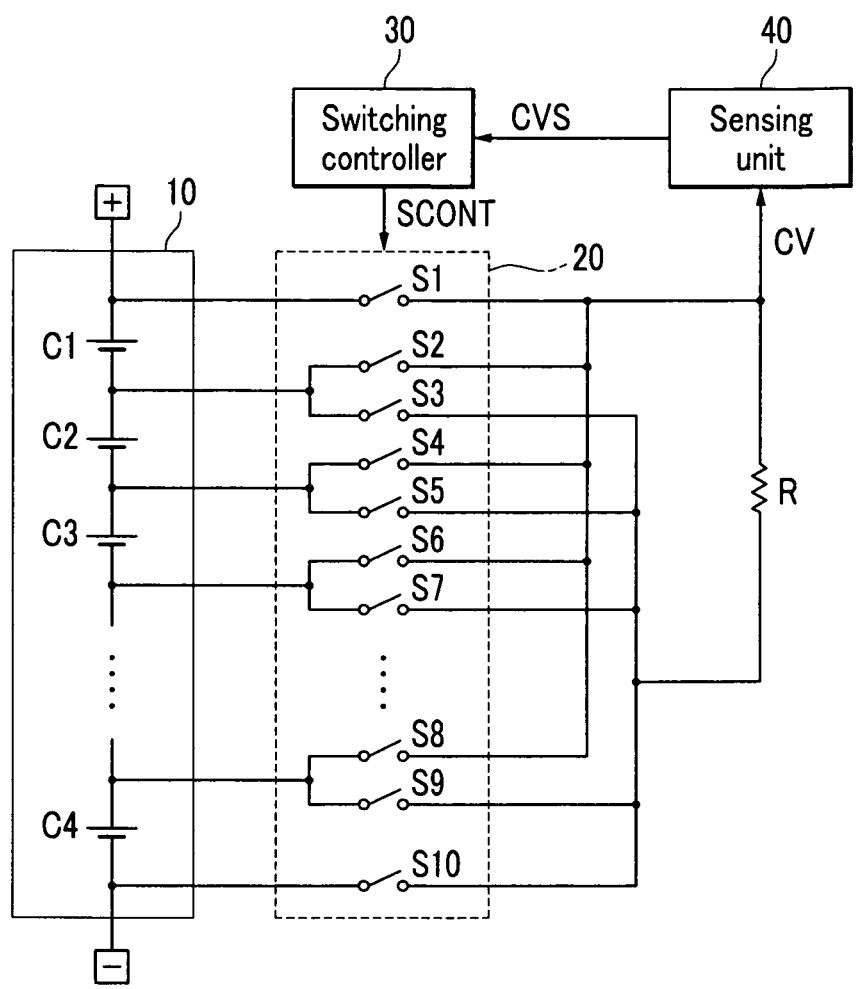
FIG. 1 is a circuit diagram of a fuel cell system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "connected" to another element, the element may be "directly connected" to the other element or "electrically connected" to the other element through a third element. In addition, unless explicitly described to the contrary, the word "comprise" and variations such as "comprises" or "comprising" will be understood to imply the inclusion of stated elements but not the exclusion of any other elements.

FIG. 1 is a circuit diagram of a fuel cell system according to an exemplary embodiment of the present invention.

Referring to FIG. 1, a fuel cell system according to an exemplary embodiment of the present invention includes a fuel cell stack 10, a switching unit 20, a discharge resistor R, a switching controller 30, and a sensing unit 40. The fuel cell stack 10 includes a plurality of unit cells C1 to C4 connected in series between a first power supply voltage terminal (+) and a second power supply voltage terminal (−). The switching unit 20 includes a plurality of discharge switches S1 to S10. The plurality of discharge switches S1 to S10 turn on or off depending upon select control signals SCONT output from the switching controller 30. The select control signals SCONT refer to a plurality of signals controlling operations of the discharge switches S1 to S10. For example, in the case that it is needed to discharge the second unit cell C2 among the plurality of unit cells C1 to C4, the select control signals SCONT turn on the second discharge switch S2 and the fifth discharge switch S5. Then, the second unit cell C2 is discharged by way of the current flowing along the discharge resistor R. Specific description thereof will be given later.

An end of the first discharge switch S1 is connected to the anode terminal of the first unit cell C1, and the opposite end thereof is connected to a first end of the discharge resistor R. An end of the second discharge switch S2 is connected to the cathode terminal of the first unit cell C1, and the opposite end thereof is connected to the first end of the discharge resistor R. An end of the third discharge switch S3 is connected to the cathode terminal of the first unit cell C1, and the opposite end thereof is connected to a second end of the discharge resistor R. An end of the fourth discharge switch S4 is connected to the cathode terminal of the second unit cell C2, and the opposite end thereof is connected to the first end of the discharge resistor R. An end of the fifth discharge switch S5 is connected to the cathode terminal of the second unit cell C2, and the opposite end thereof is connected to the second end of the discharge resistor R. An end of the sixth discharge switch S6 is connected to the cathode terminal of the third unit cell C3, and the opposite end thereof is connected to the first end of the discharge resistor R. An end of the seventh discharge switch S7 is connected to the cathode terminal of the third unit cell C3, and the opposite end thereof is connected to the second end of the discharge resistor R. An end of the eighth discharge switch S8 is connected to the anode terminal of the fourth unit cell C4, and the opposite end thereof is connected to the first end of the discharge resistor R. An end of the ninth discharge switch S9 is connected to the anode terminal of the fourth unit cell C4, and the opposite end thereof is connected to the second end of the discharge resistor R. An end of the tenth discharge switch S10 is connected to the cathode terminal of the fourth unit cell C4, and the opposite end thereof is connected to the second end of the discharge resistor R.

The discharge resistor R is connected between the opposite end of the discharge switch S1 and the opposite end of the discharge switch S10. The resistance of the discharge resistor R can be determined by the current and the unit power of the fuel cell stack 10. For example, in the case that the power of the fuel cell stack 10 is 300 W and the fuel cell stack 10 includes thirty two unit cells, the resistance of the discharge resistor R is computed based on Equation 1.

$$P=I^2R \qquad \text{Equation 1}$$

In Equation 1, P indicates power (W) of the fuel cell stack 10 per unit cell, I indicates current (A) of the fuel cell stack 10, and R indicates the resistance of the discharge resistor (ohms).

With Equation 1, assuming that the current I is 4 A, the resistance of the discharge resistor R becomes 0.59 ohms. That is, in case the power per unit cell is about 10 W, the resistance of the discharge resistor R is required to be about 0.63 ohm. The magnitude of the resistance of the discharge resistor R can be controlled by considering the number of unit cells and the current flowing along the unit cell.

The switching controller 30 generates and activates select control signals SCONT, and in one embodiment, the switching controller 30 sequentially connects the plurality of unit cells C1 to C4 to the discharge resistor R. When the voltage of the fuel cell stack 10 reaches an open circuit voltage (referred to hereinafter simply as OCV) after the power generation of the fuel cell stack 10 is stopped, the switching controller 30 synchronously generates and activates the select control signals SCONT. Herein, the activation of the select control signals SCONT means that the select control signals actually transmits to the switching unit 20 to control the operations of the discharge switches S1 to S10. The switching controller 30 also can set the activation periods of the control signals SCONT responding to the cell voltage sensing signals (CVS) output from the sensing unit 40.

The sensing unit 40 is connected to one end of the discharge resistor R, and senses the respective cell voltages (CV) of the plurality of unit cells C1 to C4 so as to generate cell voltage sensing signals (CVS). In other words, the sensing unit 40 measures cell voltage of a unit cell or unit cells that are connected to the discharge resistor R through the switching unit 20 at the given time. The cell voltage sensing signals (CVS) are signals that are activated when the respective cell voltages (CV) of the plurality of unit cells C1 to C4 reach a predetermined voltage, for instance 0V.

The operation of the above-structured fuel cell system according to an exemplary embodiment of the present invention will now be described in detail. First, when the voltage of the fuel cell stack 10 reaches the OCV after the power generation thereof is stopped, the switching controller 30 activates the select control signals SCONT controlling the operation of the discharge switches S1 and S3. Then, the anode and the cathode of the first unit cell C1 are connected to first and second ends of the discharge resistor R, respectively. Accordingly, the voltage of the first unit cell C1 is discharged by the discharge resistor R. Thereafter, when the voltage of the first unit cell C1 reaches a predetermined voltage, the sensing unit 40 activates the cell voltage sensing signals (CVS). The switching controller 30 turns off the first and third discharge switches S1 and S3, and turns on the second and fifth discharge switches S2 and S5. In other words, the select control signal, which initiates the discharge of the first unit cell C1, is deactivated when the voltage of the first unit cell C1 reaches a predetermined voltage. Then, select control signals, which control the operation of the switches S2 and S5, are activated, and the voltage of the second unit cell C2 is discharged by the discharge resistor R.

In this way, the unit cells C3 and C4 are sequentially discharged. Meanwhile, it is described in an exemplary embodiment of the present invention that a plurality of unit cells C1 to C4 are sequentially discharged, but it is also possible to selectively discharge any arbitrary unit cells.

Considering the magnitude of the resistance of the discharge resistor R, two or more unit cells may be discharged at the same time. Furthermore, without sensing the voltage of the unit cells by the sensing unit 40, the discharge switches may turn off after a predetermined period of time during which the unit cells may be sufficiently discharged. The predetermined period of time, in which the OCV voltage changes to a predetermined voltage, can be obtained from experimental data at a given resistance of the resistor R. The longest period of time among the data can be picked as the predetermined period of time, as the unit cells can be sufficiently discharged during this predetermined period of time. The discharge switches, then, turn off after this predetermined period of time. In this case, the sensing unit 40 does not need to sense the voltage of the unit cells separately, and hence the unit cell discharges can be controlled more simply.

In FIG. 1, only a limited number of unit cells and switches are shown, but the fuel cell system of the present invention can includes any number of unit cells and switches that are constructed according to the principles of the present invention.

Figure 2:
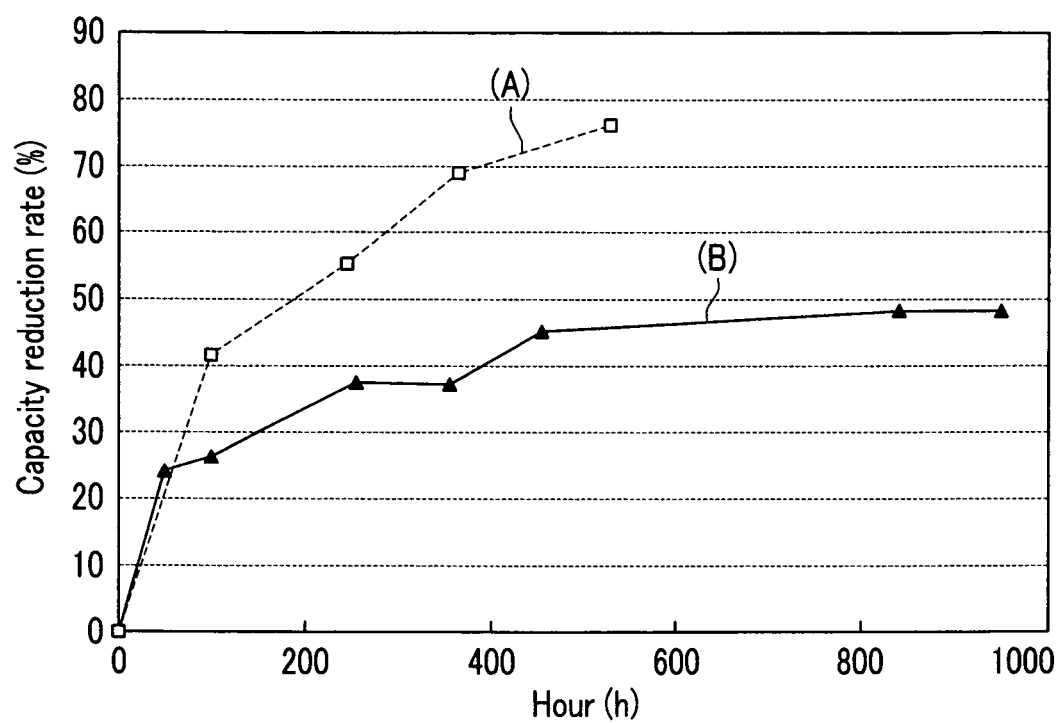
FIG. 2 is a graph illustrating the effects of a fuel cell system according to an exemplary embodiment of the present invention.

FIG. 2 is a graph illustrating the effects of a fuel cell system according to an exemplary embodiment of the present invention, in which the capacity per time reduction rate of a unit cell is given.

With an exemplary embodiment of the present invention, when the voltage of the fuel cell stack 10 reaches the OCV after the power generation of the fuel cell stack 10 is stopped while closing the switching valve, a plurality of unit cells C1 to C4 are connected to the discharge resistor R, respectively. Then, electrons are generated due to the reaction of the hydrogen gas and the oxygen gas partially injected into the anode and the cathode, and are discharged through the discharge resistor R. Accordingly, as shown in FIG. 2, the level of the cathode is discharged within the time of several seconds. The capacity reduction rate (curve B) of the unit cell according to an exemplary embodiment of the present invention is lower than the capacity reduction rate (curve A) of the unit cell without the discharge process according to a prior art. Consequently, deterioration of the fuel cell stack, due to the oxidation and dissolving of the catalyst, is prevented, and the performance of the fuel cell stack is improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A fuel cell system, comprising:
   a fuel cell stack having a plurality of unit cells producing electricity;
   a switching unit connecting the plurality of unit cells to a discharge resistor;
   a switching controller synchronously operated when the voltage of the fuel cell stack reaches an open circuit voltage after power generation of the fuel cell stack is stopped, the switching controller generating select control signals to control the switching unit; and
   a sensing unit measuring voltage of the plurality of unit cells and generating cell voltage sensing signals to control activation periods of the select control signals, the sensing unit being directly connected to one end of the discharge resistor, the switching unit comprising:
   a plurality of first discharge switches, each of the first discharge switches connecting a first terminal of one of the unit cells to a first end of the discharge resistor; and
   a plurality of second discharge switches, each of the second discharge switches connecting a second terminal of the one of the unit cells to a second end of the discharge resistor.

2. The fuel cell system of claim 1, wherein one of the unit cells is connected to the discharge resistor whenever the select control signals are activated.

3. The fuel cell system of claim 2, wherein the rest of the unit cells except said one of the unit cells are not connected to the discharge resistor.

4. The fuel cell system of claim 1, wherein the sensing unit generates the cell voltage sensing signals when the measured respective cell voltages of the plurality of unit cells reach a predetermined voltage.

5. A method of operating a fuel cell system, the method comprising steps of:

activating select control signals when a voltage of the fuel cell stack reaches an open circuit voltage after power generation of the fuel cell stack is stopped, the fuel cell system comprising a fuel cell stack including a plurality of unit cells producing electricity, a switching unit connecting the plurality of unit cells to a discharge resistor, a switching controller generating the select control signals to control the switching unit, and a sensing unit measuring voltage of the plurality of unit cells and generating cell voltage sensing signals to control activation periods of the select control signals, wherein the switching controller is synchronously operated when the voltage of the fuel cell stack reaches the open circuit voltage after the power generation of the fuel cell stack is stopped, and the sensing unit is directly connected to one end of the discharge resistor; and connecting the unit cells to the discharge resistor whenever the select control signals are activated, the switching controller setting an activation period for one of the unit cells, the one of the unit cells being connected to the discharge resistor only for the activation period, while the rest of the unit cells, except the one of the unit cells, are not connected to the discharge resistor.

6. The method of claim 5, further comprising a step of deactivating the select control signal when the voltage of the selected unit cell reaches a predetermined voltage.

7. The method of claim 5, wherein the step of connecting the unit cells to the discharge resistor comprises a step of sequentially connecting the unit cells to the discharge resistor.

8. The fuel cell system of claim 1, wherein the sensing unit measures voltage of at least one unit cell of the unit cells that is electrically connected to the discharge resistor.

9. The fuel cell system of claim 1, wherein the switching controller sets an activation period for one of the unit cells, and the one of the unit cells is connected to the discharge resistor only for the activation period, while the rest of the unit cells, except the one of the unit cells, are not connected to the discharge resistor.

10. The fuel cell system of claim 9, wherein the switching controller sets another activation period for another one of the unit cells after the activation period, another one of the unit cells being connected to the discharge resistor only for said another activation period, while the rest of the unit cells, except said another one of the unit cells, are not connected to the discharge resistor.

* * * * *